United States Patent

Bokovoy et al.

[15] 3,690,399

[45] Sept. 12, 1972

[54] AXLE ASSEMBLY FOR AN AUTOMOTIVE VEHICLE

[72] Inventors: Ronald D. Bokovoy, Bloomfield Hills; Roy G. Luvisotto, Warren, both of Mich.

[73] Assignee: Boise Cascade Corporation, Boise, Idaho

[22] Filed: Jan. 25, 1971

[21] Appl. No.: 109,154

[52] U.S. Cl. .................. 180/75, 74/650, 74/710, 180/88, 301/124 H, 308/174
[51] Int. Cl. .............................................. B60b 35/12
[58] Field of Search........... 180/75, 88; 301/1, 124 H; 308/174; 74/650, 710

[56] References Cited

UNITED STATES PATENTS

| | | | |
|---|---|---|---|
| 1,228,567 | 6/1917 | Killian | 308/174 X |
| 2,638,794 | 5/1953 | Knoblock | 74/650 |
| 3,023,057 | 2/1962 | Edwards | 180/75 X |
| 3,310,999 | 3/1967 | Griffith | 74/710 |

Primary Examiner—A. Harry Levy
Attorney—Donnelly, Mentag & Harrington

[57] ABSTRACT

An axle shaft construction for an automotive vehicle having a drive shaft, two transversely disposed drive axles, differential gearing connecting the drive shaft to the inboard ends of the axles to establish a split torque delivery path and thrust bearings and bearing retainer means situated at each outboard end of the axle housing for establishing a thrust force reaction point and for retaining the axle shafts in assembled relationship, provision being made for establishing a desired adjustment of each axle with respect to its outboard thrust bearing and for effecting the desired spacing of the inboard ends of the axles.

5 Claims, 6 Drawing Figures

INVENTOR.
RONALD D. BOKOVOY
ROY G. LUVISOTTO

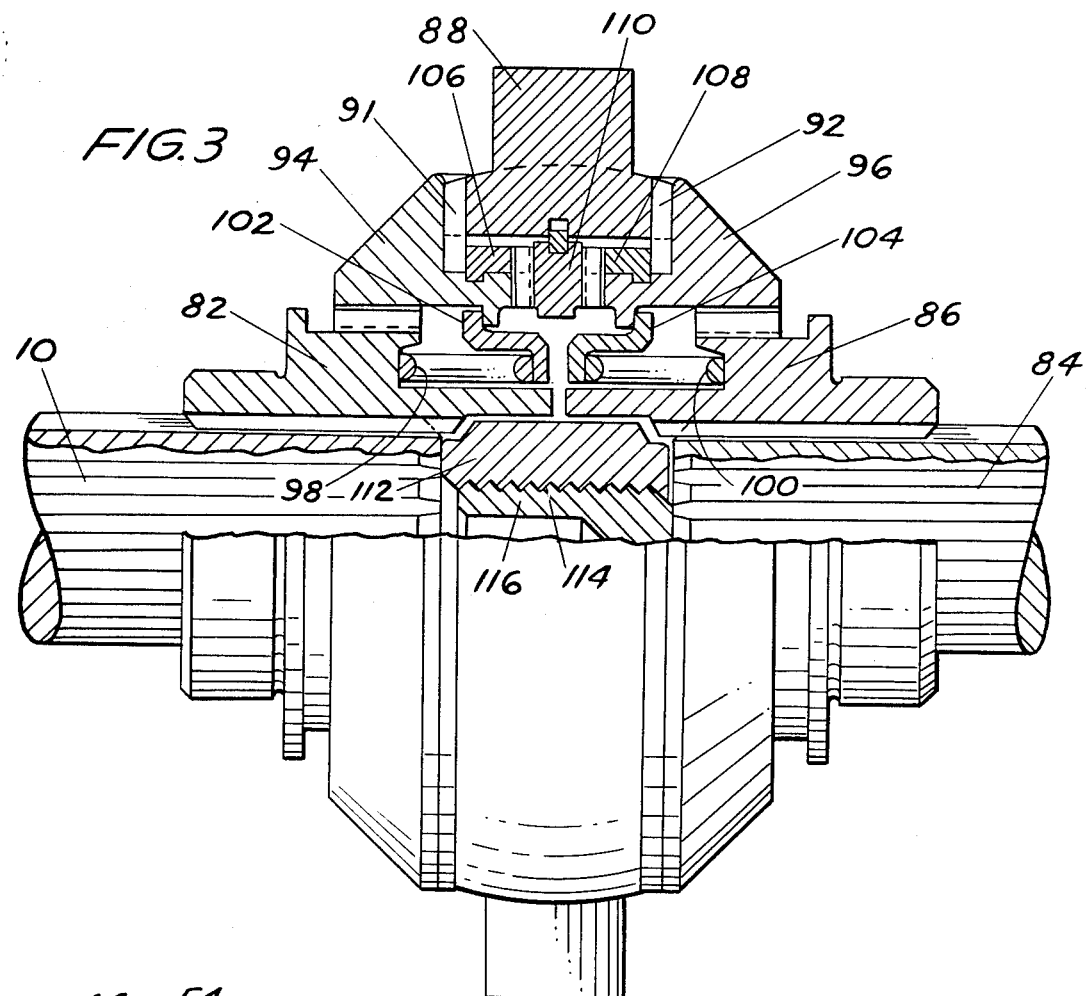
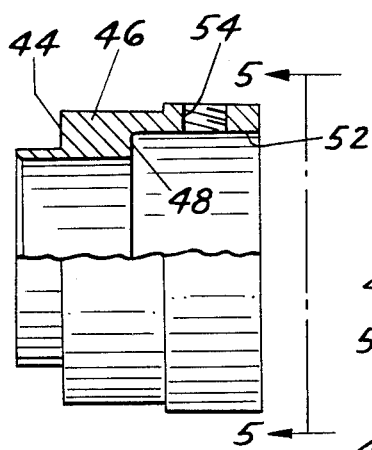
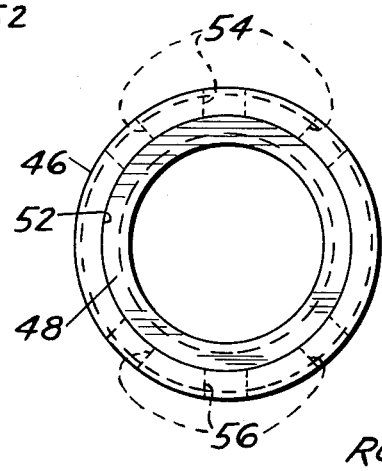
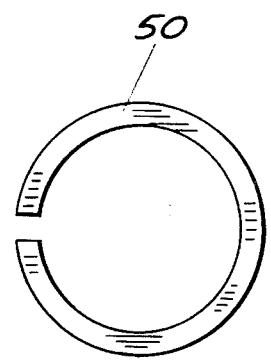
INVENTOR.
RONALD D. BOKOVOY
ROY G. LUVISOTTO

/* 3,690,399 */

AXLE ASSEMBLY FOR AN AUTOMOTIVE VEHICLE

GENERAL DESCRIPTION OF THE INVENTION

Our invention comprises improvements in axle shaft assemblies for automotive vehicles. It includes elements that are interchangeable with elements of conventional differential and axle assemblies currently used in the automotive industry. These assemblies include a geared differential mechanism having a differential ring gear drivably connected to a vehicle drive shaft situated transversely with respect to each of two axle shafts for the traction wheels of the vehicle. The ring gear is connected to the differential carrier upon which is journaled differential pinions that mesh with each of two side gears. The inboard ends of the axle shafts are drivably connected to the side gears.

The axle shaft housing is joined to or formed integrally with a differential housing which in turn is supported by the vehicle suspension system. The outboard ends of the axle shaft housings carry a vehicle wheel brake plate and an axle shaft bearing. The vehicle wheel loads are transmitted through the bearing and through the brake plate to the axle shaft housing, the latter having a fixed flange at its outboard end to which the brake plate is bolted.

The thrust forces acting on the axle shafts in an inward direction are transmitted to the differential housing through one of the side gears and through a spacer block located between the inboard ends of the axle shafts. Outwardly directed thrust forces on the axle shafts are transmitted to the associated side gear and differential carrier housing through a locking member, preferably in the form of a C-spring which partially encircles the inboard axle shaft end and which is situated in a machined groove after the axle shaft is assembled within its side gear.

A conventional axle arrangement of this type is inappropriate in those instances when it is impossible to assemble locking devices for the axle shafts within the differential carrier. If the differential design does not permit access to the interior of the differential carrier housing following assembly, both assembly and removal of shaft locking devices are prevented. The improvement of my invention overcomes this problem.

One structural feature of our invention is a thrust collar at the outboard end of each axle shaft. The axial position of the collar with respect to the axle shaft end may be carefully controlled to provide desired shaft and bearing dimensional tolerances. The thrust collar is provided with a bearing reaction shoulder which is arranged in registry with a thrust bearing situated in proximity to a radial bearing that accommodates the wheel bearing loads. A seal situated on the outboard side of the radial bearing is retained in place by a bearing retainer, which in turn is secured to a radial flange on the stationary axle shaft housing.

A secondary tolerance control is obtained by using an adjustable spacer block within the differential carrier housing. It may be inserted through either one of the differential side gears during assembly procedure.

It is possible with our improved structure to adapt a conventional differential and axle assembly to accommodate positive drive differential mechanisms which do not permit the use of inboard axle shaft retainers within the carrier housing of the differential. It also provides assurances that the correct axle end clearances are maintained in the axle assembly and that the axle shaft will not move outwardly, which sometimes happens when internally disposed axle shaft retainers fail.

BRIEF DESCRIPTION OF THE FIGURES OF THE DRAWINGS

FIG. 3 shows a positive drive differential mechanism situated in the rear axle assembly of FIG. 2.

FIG. 4 shows a thrust collar located at the outboard end of the axle shaft assembly. It forms a part of the assembly of FIG. 1.

FIG. 5 is an end view of the thrust collar of FIG. 4.

FIG. 6 shows a locking sleeve used with the thrust collar of FIGS. 4 and 5 for retaining the axle shaft shown in FIG. 1.

PARTICULAR DESCRIPTION OF THE INVENTION

Figure 1:
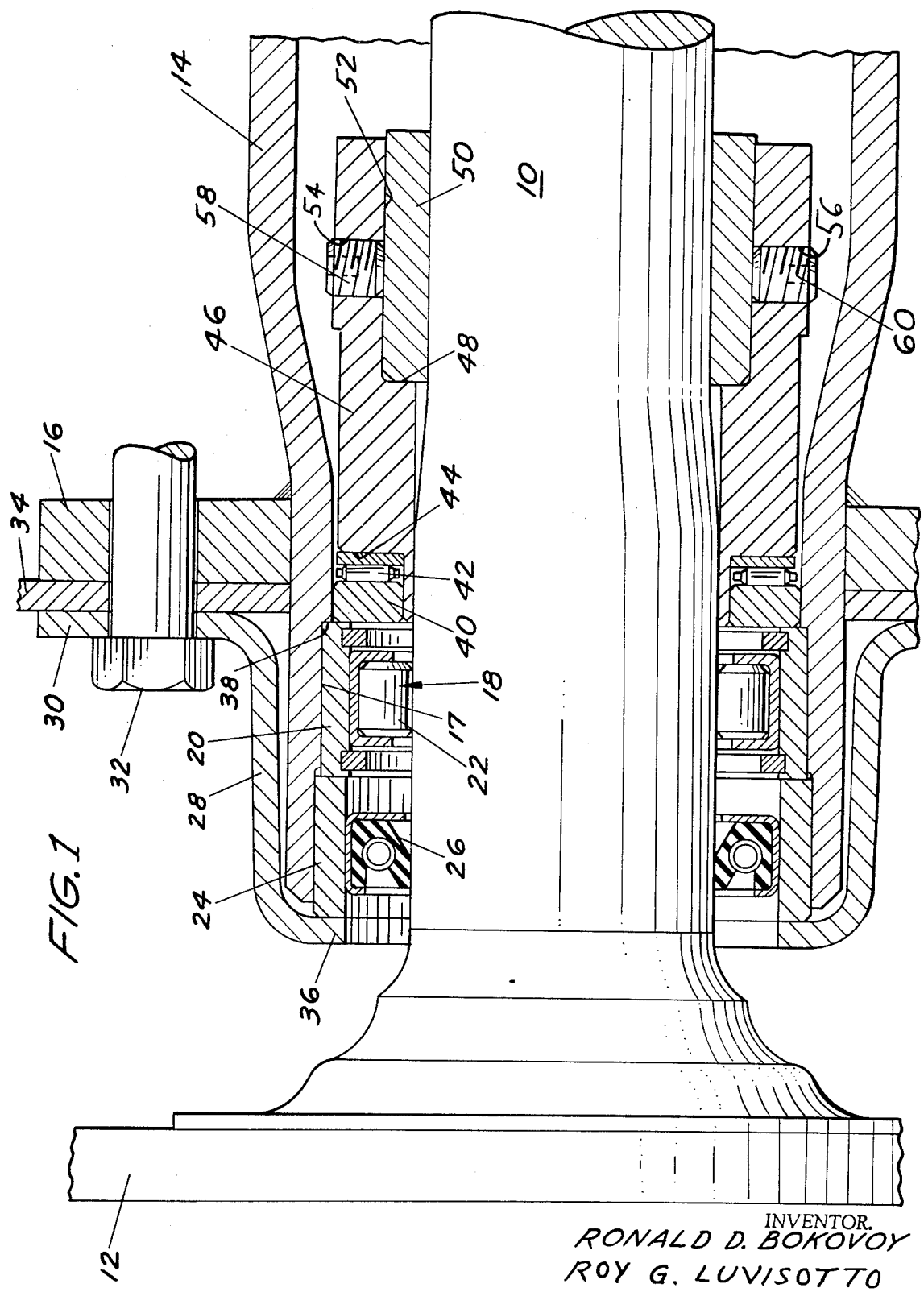
FIG. 1 shows a cross sectional assembly of the outboard end of my improved axle shaft assembly.
Figure 2:
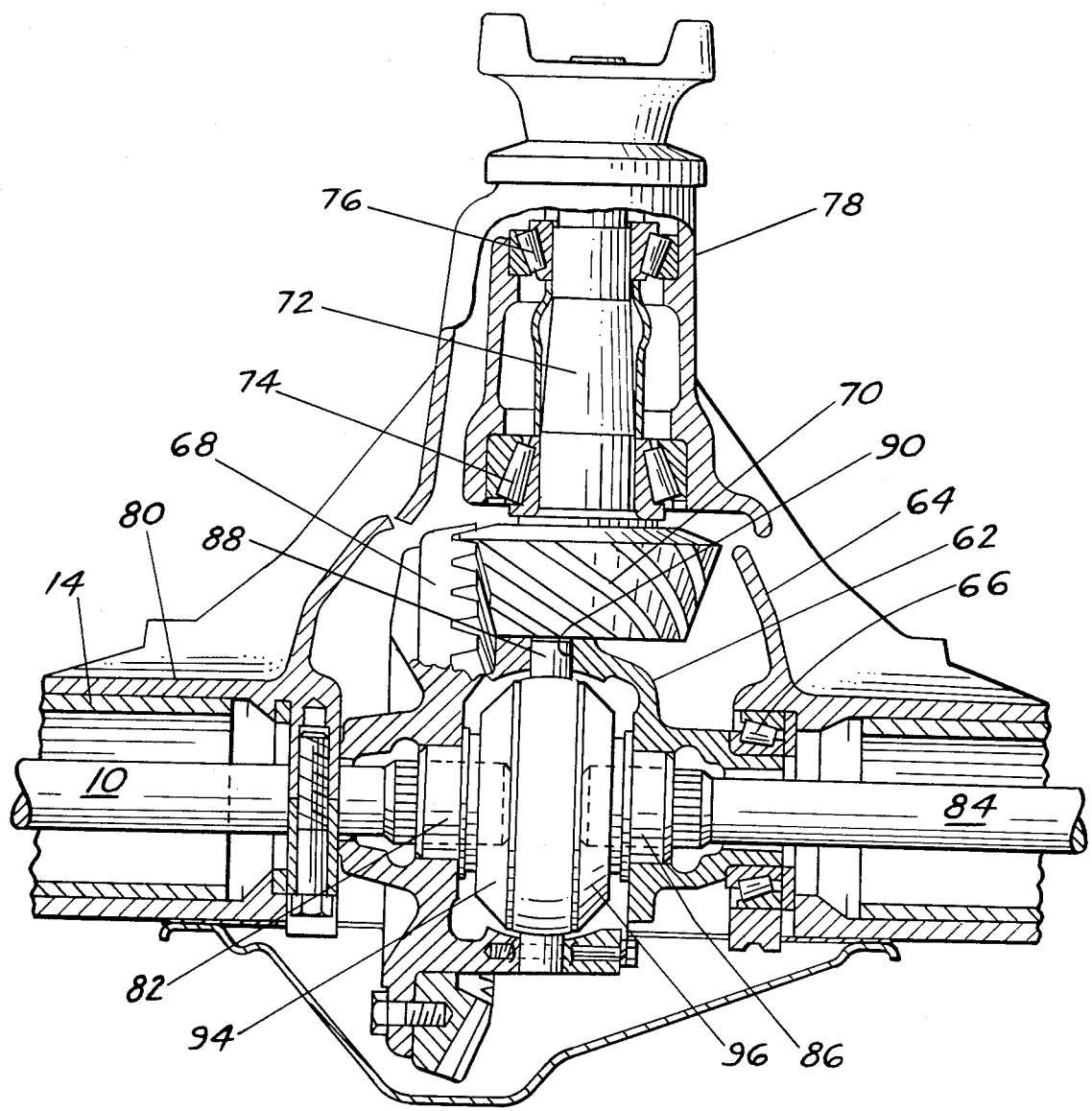
FIG. 2 shows an assembly view of a differential mechanism located at the inboard end of the axle shaft assembly, the outboard end of which is shown in FIG. 1.

Numeral 10 in FIG. 1 designates one axle shaft for an automative vehicle driveline. It includes at its outboard end a drive flange 12 which may be bolted to the vehicle wheel hub. An axle shaft housing of tubular construction surrounds the shaft 10 as shown at 14. A flange 16 is fixed to the outboard end of the housing 14.

A bearing opening 17 is machined in the outboard end of the housing 14. A roller bearing assembly 18 includes an outer race 20 fitted in the opening 17. It includes roller elements 22 which engage the cylindrical surface of the shaft 10. A circular spacer 24 is situated directly against the race 20. A fluid seal 26 is disposed between the inside cylindrical surface of the spacer 24 and the outer surface of shaft 10.

A bearing retainer bracket 28 is located at the outboard end of the housing 14. It includes a radial flange 30 which is bolted by means of bolts 32 to vehicle brake back-up plate 34, which in turn is secured directly to the stationary flange 16.

Bracket 28 includes an inwardly disposed part 36 which engages spacer 24. When the bracket 28 is clamped securely to the brake back-up plate 34, the bearing race 20 is brought into registry with internal shoulder 38 formed in the end of the housing 14.

A circular thrust race 40 is situated directly against race 20. A radial needle bearing assembly 42 registers with the thrust race 40 and with reaction shoulder 44 formed on thrust collar 46. This collar 46 is provided with an internal shoulder 48 against which is positioned locking sleeve 50.

The sleeve 50, as seen in FIG. 6, is a split ring adapted to surround the end of the shaft 10. Sleeve 50 is adapted to be positioned in a cylindrical opening 52 formed in the collar 46.

As seen in FIG. 5, collar 46 is provided with a set of threaded openings 54 on one side thereof, and a second set of threaded openings 56 on the opposite side thereof. Preferably there are three openings 54 and three openings 56 located generally in diametric opposition.

As seen in the assembly view of FIG. 1, set screws 58 are received within threaded opening 54 and set screws 60 are received within threaded openings 56. When the screws are tightened in an appropriate tightening sequence, the collar 50 frictionally engages the end of the axle shaft 10 thereby establishing a fixed relationship between the axial positions of the collar 46 and the shaft 10.

The inboard ends of the axle shaft 10 are received within differential carrier housing 62. It is journaled at spaced locations within the differential housing 64, suitable spaced tapered roller bearings 66 being provided for this purpose.

Carrier housing 62 carries a differential ring gear 68 which meshes with differential drive pinion 70. Pinion 70 is carried by differential input shaft 72 which is journaled by spaced tapered roller bearings 74 and 76 located in differential housing extension 78. The outboard end of the shaft 72 is connected to the vehicle drive shaft through a suitable universal joint (not shown).

The inboard end of the housing 14 is situated within differential housing sleeve 80 and is secured in place by welding in a conventional way.

The interior of the carrier housing 62 receives the differential elements indicated in FIG. 3. Shaft 10 is splined to an internally splined central opening in side member 82. The companion axle shaft 84 is splined at its inboard end to an internally splined opening in the opposite differential side member 86. A differential spider member 88 has outwardly extending stub shafts which are received within aligned openings 90 in carrier housing 62. Spider member 88 thus serves as a torque input member for the differential unit.

Clutch teeth 91 and 92 formed on spider member 88 mesh with cooperating clutch teeth on the clutch members 94 and 96, respectively.

Clutch members 94 and 96 are urged into clutching engagement with the teeth on the spider 88 by clutch springs 98 and 100, respectively. Springs 98 and 100 are seated on spring retainers 102 and 104, which in turn engage cooperating shoulders on the clutch hold-out rings 106 and 108. Clutch hold-out rings 106 and 108, which are supported by the clutch members, are provided with cam teeth which register with cooperating cam teeth on center cam member 110 situated between the clutch members 94 and 96.

The differential mechanism of FIG. 3 has been described in U.S. Pat. No. 3,451,496 and in copending application Ser. No. 30,851 filed Apr. 22, 1970, since abandoned. The complete structure shown in FIG. 3 and its mode of operation may be understood by referring to these related disclosures, and the description will not be repeated here.

The differential mechanism of FIG. 3 will permit a mechanical torque delivery path to be maintained between the differential ring gear and one axle shaft even though the other axle shaft will overrun during turning. A torque delivery path to each wheel will be maintained even though one traction wheel encounters a low friction road surface.

Because of the design configuration of the differential mechanism of FIG. 3, it is not possible to gain access to the interior of the side members 82 and 86. An access opening cannot be provided. After the axle shafts 10 and 84 are assembled, the axle shafts are separated by a spacer 112, which maintains the appropriate spacing between the inboard ends of the axle shafts. Spacer 112 will accommodate inwardly directed thrust forces so that the thrust of one shaft will be distributed directly to the other, but it will not resist the outwardly directed thrust forces acting on the axle shafts. These axle forces are distributed to the stationary housing 14 through the associated thrust collars in the thrust bearing assemblies at the outer ends.

The spacer 112 comprises a cylindrical member which is positioned between the axle shaft ends as shown in FIG. 3. The cylindrical member is internally threaded at 114 to receive externally threaded member 116. By appropriately threading the member 116 within the threaded opening 114, the desired spacing between the ends of the axle shafts may be controlled. The axial position of the member 116 with respect to the member 112 can be set by using a set screw or other locking device. The final degree of end-play is maintained during the assembly procedure by controlling the adjusted position of the locking sleeve 50 at each outboard end of the shaft assemblies.

Having described a preferred form of our invention, what we claim and desire to secure by U.S. Letters Patent is:

1. An axle shaft and housing assembly comprising an axle shaft, a drive flange on one end of said shaft, said drive flange being adapted to accommodate a connection with a wheel drum, an axle shaft housing, an end flange on said housing, said axle shaft being received within said housing, a thrust bracket secured to said end flange and including a portion extending over one end of said axle shaft housing, a reaction shoulder formed in said axle shaft housing end, a bearing race engageable with said shoulder, spacer means between said end of said housing and said race and adapted to be engaged by said bracket, a thrust collar having a thrust shoulder formed thereon, a thrust bearing situated between said thrust collar shoulder and said bearing race, means for establishing a frictional driving connection between the outboard end of said axle shaft and said thrust collar, a differential assembly situated at the inboard end of said axle shaft, said differential assembly having a carrier housing, and torque delivery elements in said carrier housing adapted to establish a driving connection between said carrier housing and said axle shaft inboard end.

2. The combination as set forth in claim 1, wherein each thrust collar comprises an internal opening and its thrust shoulder is formed on one end of said opening, each locking sleeve comprising a circular member in the form of a split ring surrounding the adjacent end of its axle shaft, first locking screws received through said thrust collar and engageable with said sleeve and second locking screws received through said thrust collar and engageable with said sleeve at a position generally diametrically opposed to the position of said first locking screws whereby said locking sleeve is deformed to establish a frictional driving connection between its axle shaft and its collar.

3. An axle shaft assembly comprising two axle shafts, having proximate inboard ends and oppositely disposed outboard ends, a drive flange on the outboard end of each shaft, each drive flange being adapted to accommodate a connection with a wheel drum, an axle shaft housing with housing ends adjacent said flanges, end flanges on said housing, said axle shafts being received within said housing, a thrust bracket secured to each end flange and including a portion extending over one end of said axle shaft housing, a reaction shoulder formed in each axle shaft housing end, a bearing race engageable with each shoulder, spacer means between each end of said housing and each bearing race and adapted to be engaged by a thrust bracket, a pair of thrust collars each having a thrust shoulder formed thereon, a thrust bearing situated between each thrust collar shoulder and one of said bearing races, a differential assembly situated at the inboard ends of said axle shafts, said differential assembly having a carrier housing, torque delivery elements in said carrier housing adapted to establish a driving connection between said carrier housing and each axle shaft inboard end, a locking sleeve surrounding each outboard axle shaft end, a locking sleeve received within each thrust collar, releasable means carried by said collars for exerting a radial force on said sleeves thereby establishing a frictional driving connection between each axle shaft and its thrust collar, and second spacer means for transferring inwardly directed thrust loads on one axle shaft through the other axle shaft to said carrier housing.

4. The combination as set forth in claim 3, wherein said second spacer means comprises two axially separable parts, one part being adapted to engage one axle shaft inboard end and the other part being adapted to engage the companion axle shaft inboard end, and means for adjusting one part with respect to the other thereby controlling the end clearance between said axle shafts.

5. The combination as set forth in claim 3, wherein each thrust collar comprises an internal opening and its thrust shoulder is formed on one end of said opening, each locking sleeve comprising a circular member in the form of a split ring surrounding the adjacent end of its axle shaft, first locking screws received through said thrust collar and engageable with said sleeve and second locking screws received through said thrust collar and engageable with said sleeve at a position generally diametrically opposed to the position of said first locking screws whereby said locking sleeve is deformed to establish a frictional driving connection between its axle shaft and its collar.

* * * * *